No. 670,736. Patented Mar. 26, 1901.
T. D. & C. SAPP.
ANIMAL TRAP.
(Application filed Mar. 6, 1900.)
(No Model.)
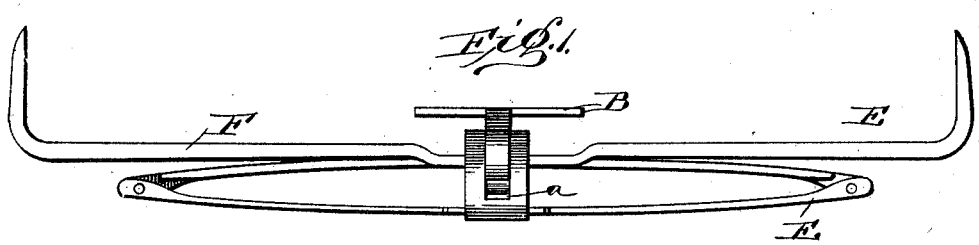
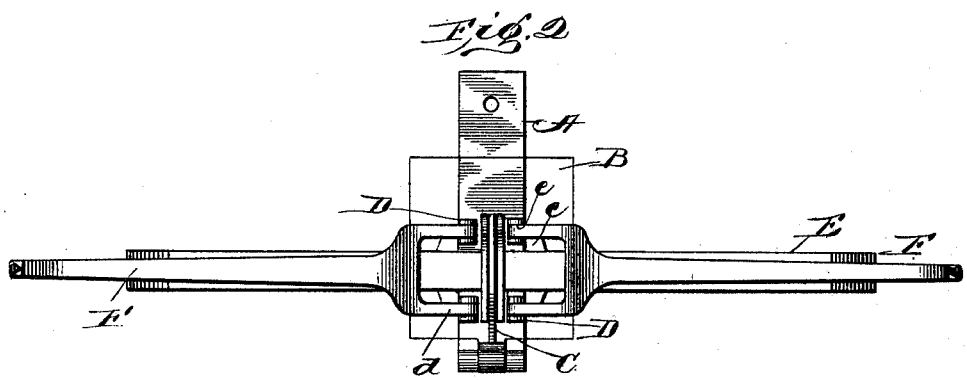
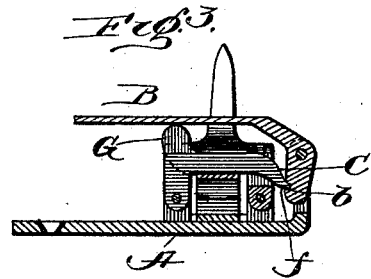
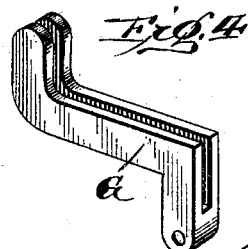

UNITED STATES PATENT OFFICE.

THOMAS DILLSON SAPP AND CASIRH SAPP, OF BAINBRIDGE, GEORGIA.

ANIMAL-TRAP.

SPECIFICATION forming part of Letters Patent No. 670,736, dated March 26, 1901.

Application filed March 6, 1900. Serial No. 7,552. (No model.)

*To all whom it may concern:*

Be it known that we, THOMAS DILLSON SAPP and CASIRH SAPP, citizens of the United States of America, residing at Bainbridge, in the county of Decatur and State of Georgia, have invented certain new and useful Improvements in Animal-Traps, of which the following is a specification.

This invention relates to traps, and more particularly to animal-traps by which the animals are caught around the neck or body, thereby preventing any injury to their fur.

The object of this invention is to provide an exceedingly cheap and simple trap that may be easily sprung and set and that will efficiently perform all of its intended functions. For the attainment of this object and for other purposes hereinafter enumerated in brief certain details of construction, arrangement, and combination of parts will be more fully described hereinafter.

The novel features of the invention are embraced in the appended claims, which are intended to accord in their terms, spirit, and meaning with the prior state of the art and the existing law.

Referring to the accompanying drawings, Figure 1 is a side elevation of our improved trap in an open or set position. Fig. 2 is a top plan view of the same. Fig. 3 is a sectional view. Fig. 4 is a detail view of the split arm.

Referring to the drawings, A represents the base of the trap, which consists of a metal plate having one end bent at right angles thereto and provided with a slot $a$ for the reception of the platform B, which is pivoted therein and provided with a dependent arm having a notch $b$ for the reception of the trip C. The other end of the base is provided with an aperture for the attachment of a chain, &c. Mounted upon the base are four uprights or standards D, arranged in pairs, one pair upon each side of the elliptical spring E, which rests at right angles across the base and is provided with lugs $c$, which engage the standards and tend to secure the spring in position.

The jaws F are each provided with two dependent arms $d$, adapted to straddle the spring, the ends of these arms being secured in the slots $e$ in the oppositely-disposed standards. The jaws are bent slightly above the dependent arms toward the center in order to give them a central position, and the ends of the jaws are bent in opposite directions, so as to prevent the animal from slipping out when clasped therein.

Pivoted between and near the base of the standards farthest from the platform is the trip C, which is made of a flat piece of metal cut in the form of a right angle, having its free end somewhat curved and provided with a catch $f$. Pivotally secured between and near the base of the oppositely-disposed standards is the split arm G, which serves to raise the platform when the trap is sprung.

In setting our improved trap the spring is forced down by spreading the jaws open. The split arm is then folded across the spring, and the trip is also folded across the spring, resting in the split arm, the catch $f$ engaging the notch $b$ in the platform.

From the foregoing description, taken in connection with the drawings, the operation of our trap will be obvious, and further description is deemed unnecessary.

Having thus described our invention, what we claim as new, and desire to secure by Letters Patent, is—

1. In an animal-trap, a base having one end bent upward at right angles thereto and provided with a slot, the said platform having a notched arm, two pairs of standards mounted upon the said base, a trip pivoted between one pair of the standards, a split arm pivoted between the oppositely-disposed pair, the said trip having a catch adapted to engage the said notch, an elliptical spring interposed between the said pairs of standards, forked arms straddling the said spring and pivoted to the oppositely-disposed standards, the free ends of the said arms being bent in, substantially as shown and described.

2. In an animal-trap, the combination of a base having one end bent at right angles thereto the said end having a slot, of a platform pivotally secured in the said slot, of standards mounted in pairs upon the said base, of an elliptical spring interposed between the said standards, of a trip pivotally secured between one pair of standards, and a split arm pivotally secured between the oppositely-disposed pair, the said trip provided with a catch, and the said platform provided with a notch, substantially as shown and for the purpose set forth.

THOMAS DILLSON SAPP.
CASIRH SAPP.

Witnesses:
  JAMES E. SAPP,
  W. G. D. TONGE.